United States Patent [19]

Seufert et al.

[11] Patent Number: 4,891,950
[45] Date of Patent: Jan. 9, 1990

[54] CONTROL SYSTEM AND METHOD FOR A SYNTHESIS GAS PROCESS

[75] Inventors: Frederick B. Seufert, Bedford Hills, N.Y.; Pierre J. Osterrieth, Ridgefield, Conn.

[73] Assignee: Texaco Inc., White Plains, N.Y.

[21] Appl. No.: 267,948

[22] Filed: Nov. 7, 1988

[51] Int. Cl.$^4$ ................................................ F25J 3/00
[52] U.S. Cl. ........................................ 62/37; 252/373; 422/111; 423/415 A; 423/650
[58] Field of Search ............ 62/37; 423/415 A, 648.1, 423/650, 228, 229, DIG. 5; 252/373; 422/111

[56] References Cited

U.S. PATENT DOCUMENTS

| | | | |
|---|---|---|---|
| 3,003,928 | 10/1961 | Proctor | 62/37 |
| 3,394,053 | 7/1968 | Shinskey | 62/37 |
| 3,699,218 | 10/1972 | Smith et al. | 423/415 A |
| 3,723,345 | 3/1973 | Reynolds | 252/373 |
| 3,985,864 | 10/1976 | Vautrain et al. | 423/DIG. 5 |
| 4,025,318 | 5/1977 | Moody et al. | 423/650 |
| 4,351,803 | 9/1982 | Olson | 422/111 |
| 4,553,981 | 11/1985 | Fuderer | 423/648.1 |

Primary Examiner—Ronald C. Capossela
Attorney, Agent, or Firm—Robert A. Kulason; James J. O'Loughlin; Ronald G. Gillespie

[57] ABSTRACT

A synthetic gas generator receiving oxygen and natural gas through separate pipes provides synthetic gas. The methane content of the synthetic gas is sensed and a corresponding methane signal is provided. Carbon monoxide and fuel hydrogen are removed from the synthetic gas and provided in different pipes. The pressure of the carbon monoxide is sensed and a corresponding pressure signal is provided. Control apparatus controls the oxygen and natural gas entering the synthetic gas generator in accordance with the methane signal and the pressure signal.

12 Claims, 1 Drawing Sheet

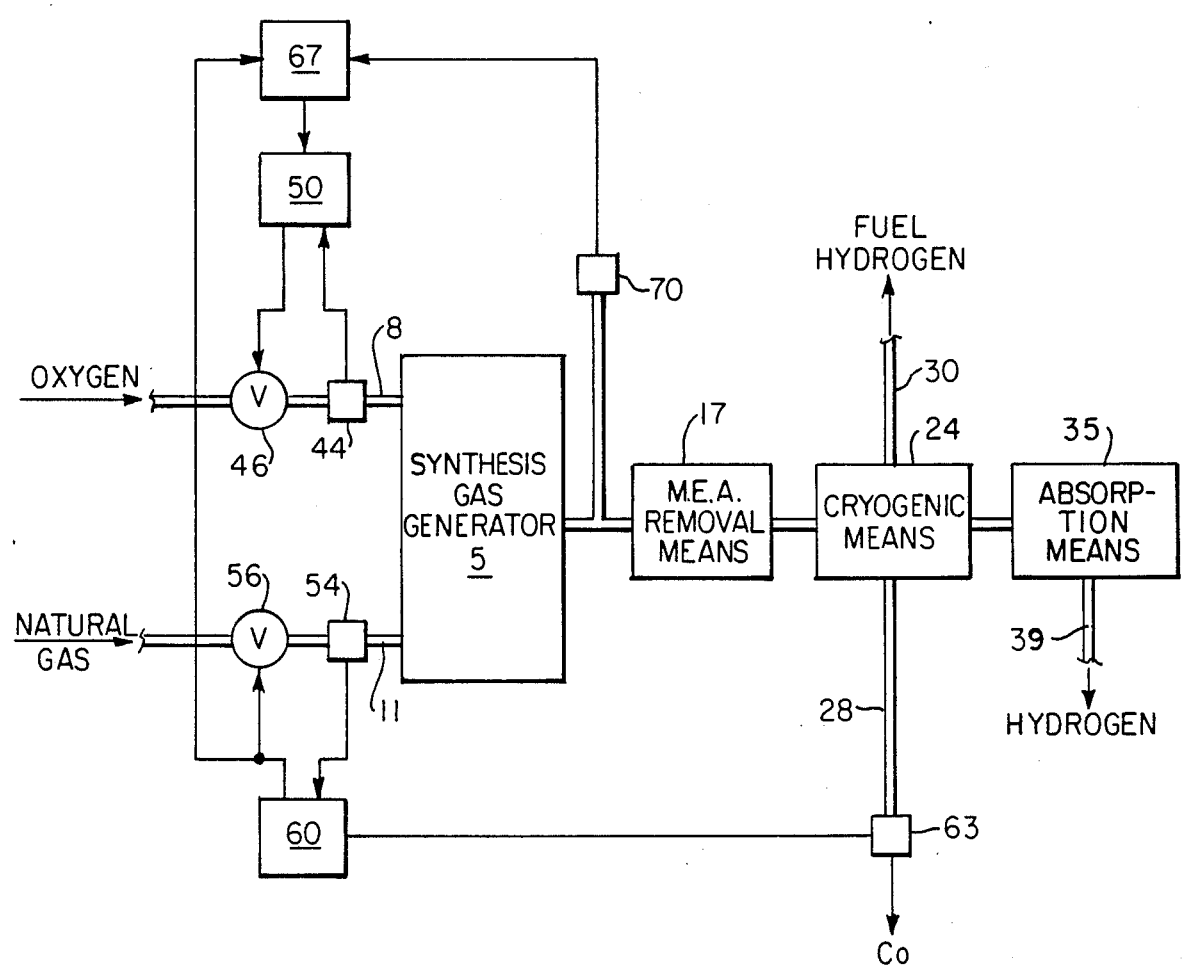

CONTROL SYSTEM AND METHOD FOR A SYNTHESIS GAS PROCESS

BACKGROUND OF THE INVENTION

Field of the Invention

The present invention relates to a control system and method for a synthesis gas process.

SUMMARY OF THE INVENTION

A synthesis gas generator receiving oxygen and natural gas through separate pipes provides synthesis gas. The methane content of the synthesis gas is sensed and a corresponding methane signal is provided. Carbon monoxide and fuel hydrogen are removed from the synthesis gas and provided in different pipes. The pressure of the carbon monoxide is sensed and a corresponding pressure signal is provided. Control apparatus controls the oxygen and natural gas entering the synthesis gas generator in accordance with the methane signal and the pressure signal.

The objects and advantages of the invention will be described more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

DESCRIPTION OF THE DRAWING

The FIGURE is a partial schematic representation and process and a partial simplified block diagram of a control system constructed in accordance with the present invention for controlling a synthesis gas process.

DESCRIPTION OF THE INVENTION

Referring to the FIGURE, there is shown an existing commercial process which includes a synthesis gas generator 5 receiving oxygen by way of a line 8 and natural gas by way of a line 11 and providing synthesis gas to an acid gas removal means 17 by which carbon dioxide and hydrogen sulfide are removed from the synthesis gas. The output from means 17 is provided to a cryogenic means 24 for cooling. Cryogenic means 24 provides carbon monoxide by way of a line 28 and fuel hydrogen by way of line 30. Cryogenic means 24 also provides high pressure hydrogen to an absorption means 35 which purifies the hydrogen and provides high pressure hydrogen by way of line 39. Absorption means 35, when at a high pressure, absorbs contaminants and when at a low pressure regenerates the absorption material within it.

All of the foregoing is for an established in-use process. The present invention provides a control system for that process so as to control the oxygen and natural gas being provided to synthesis gas generator 5. In this regard, a flow transmitter 44 and a valve 46 is located in line 8. Flow transmitter 44 senses the flow of the oxygen and provides a corresponding signal to a flow controller 50. Flow controller 50 provides a signal to valve 46 to control the flow of oxygen entering synthesis gas generator 5 in accordance with flow controller 50 set points as hereinafter described.

Similarly, a flow transmitter 54 and a valve 56 are located in line 11 and cooperate with a flow controller 60 in a similar manner as controller 50 to control the flow of natural gas entering synthesis gas generator 5. A pressure sensor located in line 28 senses the pressure of the carbon monoxide being provided by cryogenic means 24 and provides a signal to flow controller 60 so as to control the flow of natural gas as a function of the pressure of the carbon monoxide.

Flow recorder 60 in addition to providing the signal to valve 56 also provides the signal to a proportional controller 67. Infrared analyzer 70 samples the gas leaving synthesis gas generator 5 and provides a signal corresponding to the methane content of the gas to proportional controller 67. Proportional controller 67 provides a signal to controller 50 to adjust its set points so as to control the flow of oxygen as a function of the natural gas content and the methane content of the synthesis gas.

What is claimed is:

1. A control system for controlling a synthesis gas process comprising:
   generator means receiving oxygen and natural gas through separate pipes for providing synthesis gas,
   methane sensing means connected to the generator means for sensing the methane content of the synthesis gas and providing a methane signal corresponding thereto,
   removal means connected to the generator means for removing carbon monoxide and fuel hydrogen from the synthesis gas and providing the carbon monoxide and the fuel hydrogen to separate pipes,
   pressure sensing means connected to the pipe containing the carbon monoxide for sensing the pressure of the carbon monoxide in the pipe and providing a pressure signal corresponding thereto, and
   control means connected to the pipes carrying the oxygen and natural gas, to the methane sensing means and to the pressure sensing means for controlling the oxygen and natural gas entering the generator means in accordance with the methane signal and the pressure signal.

2. A control system as described in claim 1 in which the control means includes:
   means connected to the pipe carrying the natural gas and to the pressure sensing means for controlling the flow of natural gas entering the generator means as a function of the pressure of the carbon monoxide in the pipe containing the carbon monoxide.

3. A control system as described in claim 2 in which the control means includes:
   means connected to the pipe carrying the oxygen for controlling the oxygen entering the generator means as a function of the natural gas entering the generator means and the methane content of the synthesis gas.

4. A control system as described in claim 3 in which the natural gas control means includes:
   means for sensing the flow of the natural gas in the pipe and providing a natural gas flow signal corresponding thereto,
   valve means connected in the pipe and responsive to a natural gas control signal for controlling the flow of the natural gas, and
   controller means connected to the natural gas flow sensing means, to the natural gas valve means and to the pressure sensing means for providing the natural gas control signal to the valve means in accordance with the pressure signal and the natural gas flow signal.

5. A control system as described in claim 4 in which the oxygen control means includes:

means for sensing the flow of oxygen in the pipe and providing an oxygen flow signal representative thereof, oxygen valve means located in the oxygen pipe responsive to an oxygen control signal for controlling the oxygen flow to the generator means, and means connected to the oxygen flow sensing means and to the oxygen valve means, to the methane sensing means and to the natural gas controller means for providing the oxygen control signal to oxygen valve means in accordance with the natural gas flow control signal, the oxygen flow signal and the methane signal.

6. A control system as described in claim 5 in which the last mentioned means includes:

means connected to the natural gas controller means and to the methane sensing means for providing a proportional signal in accordance with the natural gas control signal and the methane signal, and oxygen controller means connected to the proportional means to the oxygen flow sensing means and to the oxygen valve means for providing the oxygen control signal to the oxygen valve means in accordance with the oxygen flow signal and the signal from the proportional means.

7. A control method for controlling a synthesis gas process comprising the steps of:

receiving oxygen and natural gas through separate pipes, providing synthesis gas from the received oxygen and natural gas, sensing the methane content of the synthesis gas, providing a methane signal corresponding to the sensed methane content, removing carbon monoxide and fuel hydrogen from the synthesis gas, providing the carbon monoxide and the fuel hydrogen to separate pipes, sensing the pressure of the carbon monoxide in the pipe, providing a pressure signal corresponding to sensed carbon monoxide pressure, and controlling the receiving of the oxygen and the natural gas in accordance with the methane signal and the pressure signal.

8. A control method as described in claim 7 in which the control step includes:

controlling the flow of natural gas being received in accordance with the pressure signal.

9. A control method as described in claim 8 in which the control step includes:

controlling the oxygen being received as a function of the natural gas being received and the methane content of the synthesis gas.

10. A control method as described in claim 9 in which the natural gas control step includes:

sensing the flow of the natural gas in the pipe, providing a natural gas flow signal corresponding to the sensed natural gas flow, valve means for controlling the flow of the natural gas in the pipe accordance with a natural gas control signal, and providing the natural gas control signal in accordance with natural gas flow signal and the pressure signal.

11. A control method as described in claim 10 in which the oxygen control step includes:

sensing the flow of oxygen in the pipe, providing an oxygen flow signal corresponding to the sensed oxygen flow, controlling the oxygen flow in the pipe in accordance with an oxygen control signal, and providing the oxygen control signal in accordance with the natural gas flow control signal and the methane signal.

12. A control method as described in claim 11 in which the last mentioned step includes:

providing a proportional signal in accordance with the natural gas control signal and the methane signal, and providing the oxygen control in accordance with the oxygen flow signal and the proportional signal.

* * * * *